Figure 1:
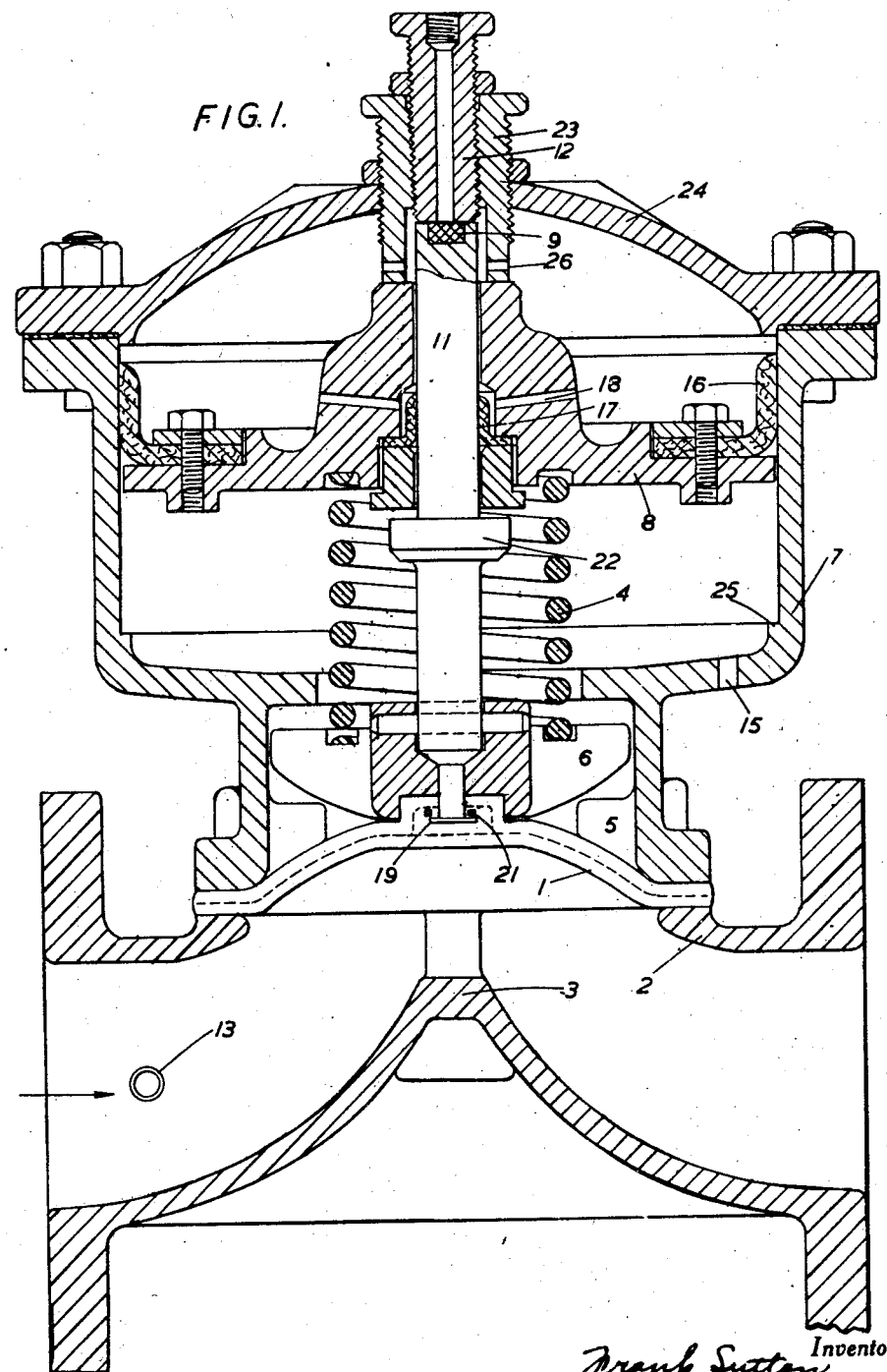

Dec. 3, 1946.    F. SUTTON    2,412,105
FLUID CONTROLLING VALVE
Filed April 3, 1943    3 Sheets-Sheet 1

Inventor,
Frank Sutton
By Simon Broder,
Attorney.

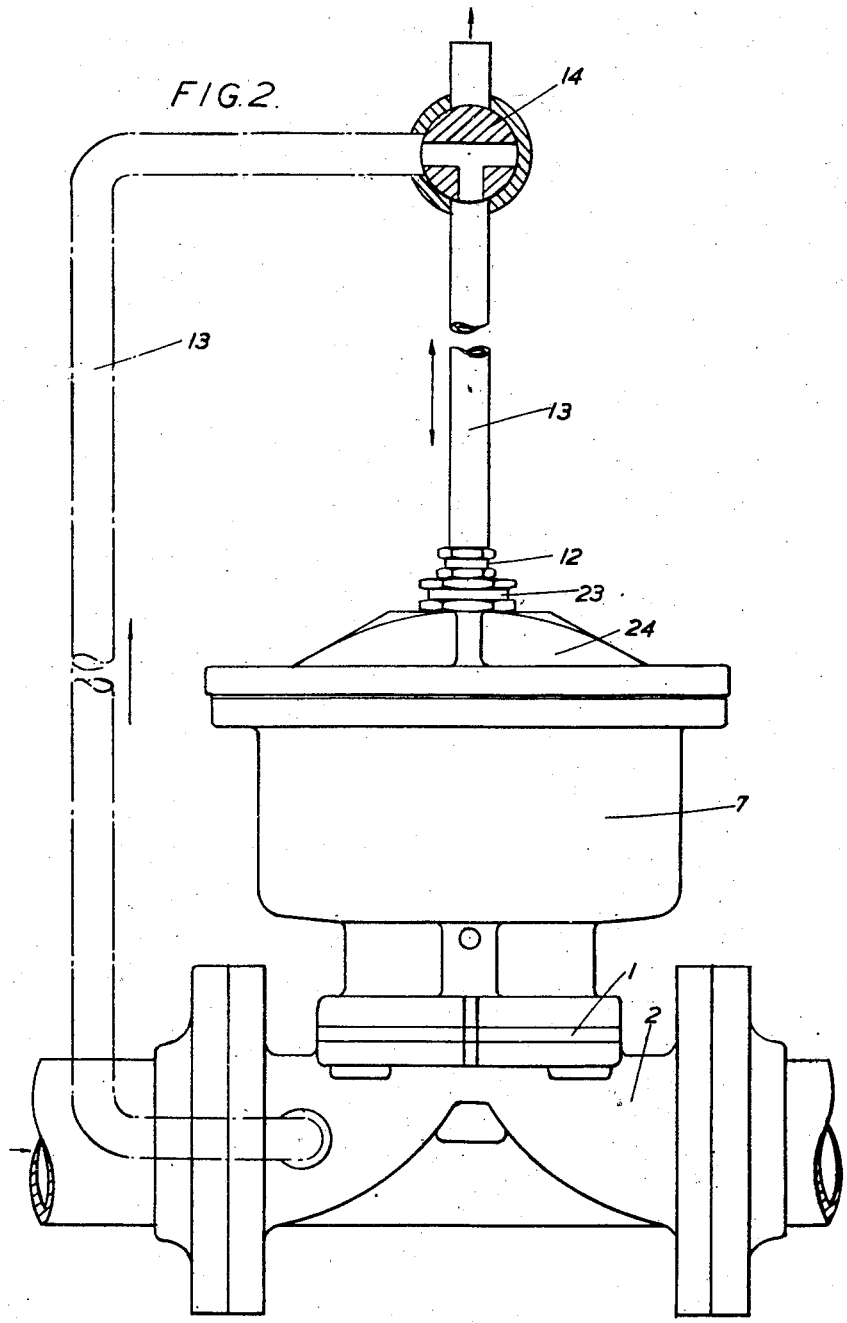

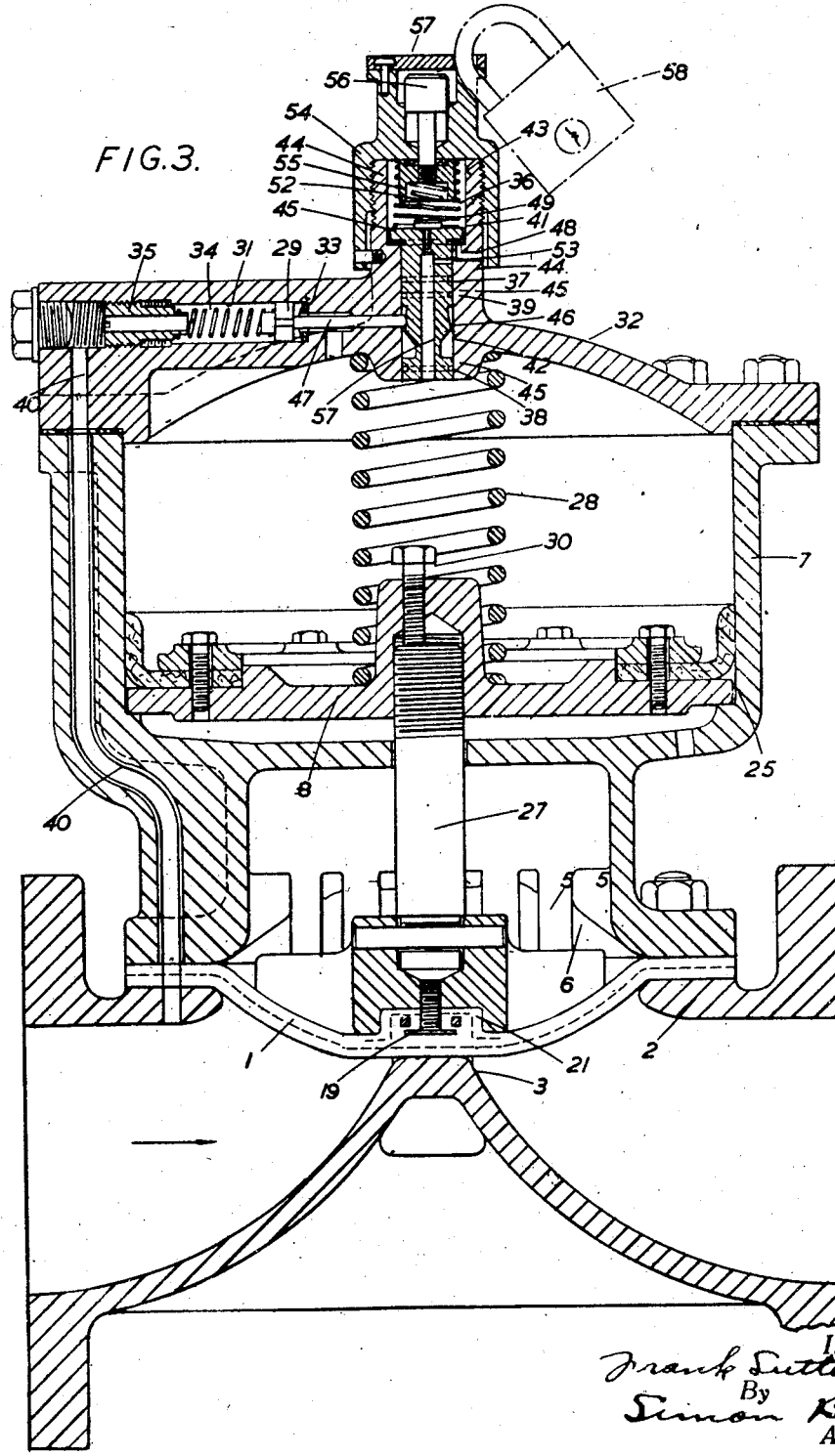

Patented Dec. 3, 1946

2,412,105

UNITED STATES PATENT OFFICE 2,412,105

FLUID CONTROLLING VALVE

Frank Sutton, Cwmbran, England, assignor to Saunders Valve Company Limited, Cwmbran, England Application April 3, 1943, Serial No. 481,747
In Great Britain March 30, 1942

4 Claims. (Cl. 137—153)

Consuming devices fed with pressure fluid from a supply system will cease to operate if the pressure in the system falls and may be left unattended while still connected to the system, thereby making it dangerous to restore the pressure in the system when the cause of failure has been remedied. As a safeguard against such danger it has been proposed to connect consuming devices to the system by a valve which closes automatically when the pressure falls below a determined value and does not re-open if the pressure is restored, except after a manipulation by an attendant who should satisfy himself that no danger will result.

The object of the present invention is the production of a self-closing and self-locking valve for this and like purposes, which operates without constant leakage of pressure fluid in either its open or its closed position. A common use for such valves is on compressed air systems operating pneumatic tools in mines where the air is heavily laden with dust, and it is important that the valve shall operate satisfactorily and without rapid deterioration even with dust-laden air as the pressure fluid.

To this end an auxiliary valve which opens under spring action when the fluid pressure falls sufficiently is arranged to bring the fluid pressure to bear upon the valve to close it. So long as the auxiliary valve remains open no subsequent increase in the fluid pressure can open the valve, notwithstanding that the valve may when closed be subject to fluid pressure in a direction tending to open it, because the increased pressure per square inch is also brought to bear through the auxiliary valve in a direction to close the valve.

The total closing pressure may be made to exceed any pressure in the opposite direction either by biassing the valve by a spring towards its closed position, or by having the fluid which passes through the auxiliary valve act on a larger area than is subject to fluid pressure in the direction for opening, for instance, in the case of a tappet valve upon a diaphragm attached to its stem. Even when the valve is of the diaphragm type and therefore well adapted to act as a piston, it is desirable to provide a piston of larger area, to which the fluid has access through the auxiliary valve, to operate the valve. A biassing spring is still useful, though such a piston be provided, to close the valve in case the fluid pressure drops suddenly to a negligible value.

In one simple construction this biassing spring may be the spring which actuates the auxiliary valve, the auxiliary valve being mechanically connected to, or actually a part of, the principal valve. Or it may be separate and have its own spring, in which case other means must be provided for locking it in open position when once it has opened.

Where the auxiliary valve is actuated by the principal valve the manual operation necessary to enable the principal valve to re-open after the fluid pressure has been restored may consist in the operation of a cock by which the supply of pressure fluid holding the valve closed is cut off, notwithstanding that the auxiliary valve is open, and the existing pressure is relieved by release of fluid to the atmosphere; the opening of the valve will close the auxiliary valve. The manually operated cock needs to be held open until any temporary fall of pressure due to flow into the downstream capacity of the system has ceased, but it must then be restored to its original position. To this end it may be provided with a restoring spring so that it returns as soon as it is no longer held; or it may be detained in open position against the action of a restoring spring by a catch which is released by a piston subjected to the fluid pressure on the downstream side of the valve. Similarly where an auxiliary valve independent of the principal valve is held open against the pressure of the fluid the means which detains it may be released pneumatically as the result of a momentary opening of a release valve on one side of a piston to both sides of which the pressure fluid has access, on the one side through a non-return valve and on the other side directly.

Two constructions of the invention applied to diaphragm valves are illustrated in the accompanying drawings—

Figure 1 being an axial section and

Figure 2 an elevation with a detail in section of one construction, while

Figure 3 is an axial section of an alternative construction.

In both constructions the valve to be operated comprises a diaphragm 1, clamped on a casting 2 in a position more or less parallel with a fluid passage through the casting beneath it. The casting presents a weir 3 extending across the fluid passage, and on this the diaphragm may by downward pressure be made to bed throughout a diameter of the diaphragm, thereby sealing the fluid passage.

The valve may normally be held open by the pressure of the fluid on its under surface against the action of a spring 4. Intermeshing annular combs 5, 6, the one on the wall of the valve actuator casing 7, and the other forming the spring abutment, distribute the mechanical pressure and the reaction to the fluid pressure over the diaphragm, so that it is not undesirably stressed.

As soon as the pressure of the fluid on the underside of the diaphragm falls below the pressure exerted by the spring 4, the valve will begin to close. It is undesirable that the valve should be left to close under the possibly small difference between these two pressures, so the initial movement of the valve should at least bring about the equalisation of the fluid pressure on its two sides by admitting the fluid above it, so that the valve closes under the unresisted pressure of the spring.

Preferably a still greater closing pressure is obtained by the use of a piston 8 of larger diameter than the diaphragm, moving in a cylindrical part of the valve actuator casing 7. Fluid is admitted to provide this balancing or over-riding pressure by an auxiliary valve operated by the initial movement of the main valve towards closed position. In the construction shown in Figures 1 and 2 this auxiliary valve is formed by the end 9 of a stem 11 secured to the diaphragm 1, this end 9 seating on a sleeve 12 which is connected by a pipe 13 with the upstream side of the channel controlled by the valve 1, as shown, for instance, in chain lines in Figure 2. In the pipe 13 is a hand-operated three-way cock 14 shown in section in Figure 2.

The space within the casing 7 below the piston 8 is open to the atmosphere through a hole 15, small enough to prevent free ingress of moisture by splashing. The piston 8 is made tight in its cylinder by a cup leather 16, and upon the stem 11 by a hat leather 17 to which the fluid has access through channels 18. The stem 11 is pinned to the spring abutment 6, to the underside of which it is secured by a diaphragm attachment stud with its head 19 moulded into the rubber of the diaphragm 1 and secured by a ring 21 also moulded in, which prevents the annulus of rubber above the head 19 from yielding outward without shearing. A collar 22 on the stem 11 enables the piston 8 to prevent the diaphragm's lifting from closed position under a fluid pressure sufficient to compress the spring 4. Upward movement of the piston 8 is limited by the sleeve 23 which can be adjusted in the cover 24 of the casing 7, in order that the pressure of the spring 4 upon the diaphragm may be adjusted to any desired value less than the normal fluid pressure upon the diaphragm. The pressure of the diaphragm upon the weir 3 in the closed position of the valve is limited by the provision of a shoulder 25 on the casing 7 by which the descent of the piston 8 is arrested. The sleeve 12 is adjustable in the sleeve 23 so that the end 9 of the stem 11 may seat firmly upon it without preventing the diaphragm from bedding on the comb 5. Openings 26 in the sleeve 23 afford free communication between the bore of the sleeve 12 and the space above the piston 8.

If the fluid pressure on the diaphragm 1 falls below the pressure exerted by the spring 4 in the position of the parts shown in Figure 1 the diaphragm will begin to descend carrying with it the stem 11. The valve 9 is therefore opened and fluid passes from the upstream side of the main valve through the pipe 13 and cock 14 to the space above the piston 8. The main valve then promptly closes under the excess of the fluid pressure on the piston over that on the diaphragm. This excess will vary with the fluid pressure, but the maximum pressure bedding the diaphragm on the weir 3 is determined as above mentioned by the spring 4 and the position of the shoulder 25. If the fluid pressure increases after the valve has been closed the piston 8 is only held the more firmly upon the shoulder 25 and the valve cannot open. The valve can only be opened by hand operation of cock 14. By turning the cock through a right angle the space above the piston 8 is cut off from the upstream side of the main valve and is connected to atmosphere. The pressure in the system can therefore raise the diaphragm 1 and with it the piston 8 and thereby close the valve 9. The cock 14 should return under spring action to its original position when released. When it does so the valve 9 is not re-opened, since the pressure on the small area of the valve is vastly less than the pressure on the underside of the diaphragm.

The construction of the diaphragm valve shown in Figure 3 is substantially the same as that of the valve in Figures 1 and 2, and it, too, is closed by pressure on a piston 8 sliding in the actuator casing 7. There is, however, no spring between the piston and the valve, but instead a spring 28 above the piston, and the piston is screwed upon the stem 27 attached to the diaphragm. This connection affords a means for adjusting the distance between diaphragm and piston, so that notwithstanding variations in the thickness of diaphragms and tolerance in the distance between the shoulder 25 and weir 3 the diaphragm may be firmly pressed upon the weir in the closed position without being damaged. The adjustment is locked by an eccentric set screw 30.

The control of the valve is different inasmuch as the auxiliary valve by which fluid is admitted above the piston is not controlled by the difference between the pressure of a spring and the pressure on the diaphragm 1, but by the difference between the pressure of a spring and the pressure on the auxiliary valve itself. The auxiliary valve is here a grooved block 29 sliding in a bore 31 in the cover 32 of the casing 7. At the end of the bore is a rubber or like resilient seat 33 for the valve. The valve is pressed towards its seat by a spring 34 adjustable by screwing the abutment 35 along the outer threaded part of the bore 31. The end of the bore 31 is closed by a screw block, and the bore is connected by a channel 40 in the thickness of the cap 32 and casing 7 to the main fluid channel on the upstream side of the main valve. The spring which determines the opening of the auxiliary valve 29 is the spring 36 which acts upon a piston, cam and valve unit 37. This unit is a piston inasmuch as it has cylindrical parts 38, 39, 41 which are sliding fits in corresponding aligned bores 42, 43 in a boss 44 on the cover 32 and are made substantially fluid-tight by grooves 45. It is a cam inasmuch as its coned part 46 acts upon the stem 47 of the auxiliary valve 29. It is a valve inasmuch as its enlarged head 41 seals an opening 48 to the atmosphere in the shoulder connecting the two bores 42 and 43, being faced with rubber or the like for that purpose. Moreover it carries a one-way valve 49 which seals a central channel 51 through the unit under the action of a light spring 52. A lateral branch 53 from the channel 51 extends to the cylindrical surface of the part 39 of the unit 37. The spring 36 by which the unit 37 is pressed down and the valve 41 held closed abuts on a cap 54 screwing upon the boss 44. The spring 52 which holds closed the non-return valve 49 abuts upon and within a block 55 on the stem of a press-button 56 sliding in the cap 54 and normally enclosed by a pivoted disc 57 which can be locked by a padlock 58. The block 55 also forms a valve, sealing by a rubber disc the opening in which the stem of the press-button slides.

In this construction auxiliary valve 29 opens when the pressure of the fluid upon it added to the pressure of its own spring 34 is overcome by the pressure of spring 36 exerted through the cam 46 upon its stem 47; springs 34 and 36 are strong enough to make the friction of the cam and other parts relatively negligible. When this occurs the unit 37 moves downward to the position shown in Figure 3 and the valve 29 is first opened by the coned part of the cam 46 and then held open by the reversely coned part next above the cone. The fluid can therefore pass through the valve into the space above the piston 8, force the piston down and close the main valve 1. If the pressure should fall suddenly to zero the valve 1 will nevertheless be closed by the spring 28, subsequent increase of fluid pressure cannot reverse these events, the cam 40 not being movable by the stem 47; the only effect of such increase is to hold the piston 8 more firmly upon the shoulder 25. To re-open the valve 1 access must be had to the push-button 56, and the button must be pressed down. The fluid contained within the bore 43 of the boss 44 then escapes around the press-button stem and the press-button or along grooves in their surface. No more fluid can enter this bore because the non-return valve 49 is firmly held on its seating so long as the press-button is held down. So the fluid pressure on the underside of the piston, cam and valve unit 37 lifts the unit, provided it exceeds the pressure of the springs 36 and 52, the finger pressure being relatively negligible if full fluid pressure has been restored; if the fluid pressure is insufficient nothing further happens. If the unit 37 rises the cam 46 permits the auxiliary valve to close, and the valve 41 opens. The fluid above the piston 8 can then escape through 51, 53 and 48, and the fluid pressure at first upon one half and subsequently on the whole of the diaphragm 1 can lift the diaphragm and the piston to open position.

If it should be desired to close the valve 1 notwithstanding that there is full fluid pressure in the passage it controls, this may be done by pressing down the press-button 56; for the cam 46 is thereby pressed down mechanically and retained by the valve stem 47, and the valve 29 is opened; the valve 1 will open again upon a second depression of the press-button.

What I claim is:

1. A self-closing and self-locking valve, comprising a body in which is a channel for the fluid to be controlled, a valve for closing said channel, pressure-fluid-actuated means for closing said valve, an auxiliary valve controlling the flow of fluid from the upstream side of said valve to said closing means, spring-actuated means for opening said auxiliary valve when the pressure of the fluid falls, and for locking it in open position, and a hand-operated cock for making the fluid admitted through said auxiliary valve effective to release said locking means in opposition to its actuating spring.

2. A self-closing and self-locking valve, comprising a body in which is a channel for the fluid to be controlled, a valve for closing said channel, pressure-fluid-actuated means for closing said valve, an auxiliary valve controlling the flow of fluid from the upstream side of said valve to said closing means, means for opening and holding open said auxiliary valve including a cylinder to which the fluid has access through said auxiliary valve, a piston in said cylinder, a one-way valve in said piston allowing fluid to pass from the side next the auxiliary valve to the other side, a spring pressing said piston in the direction for opening said auxiliary valve, and a hand-operated cock for temporarily holding closed said one-way valve and releasing the fluid which has passed through it.

3. A self-closing and self-locking diaphragm valve, comprising a body in which is a channel incorporating a diaphragm seat, a diaphragm adapted to bed on the seat to close the valve, an opening in the channel opposite the diaphragm, fluid-actuated valve-closing means including a conduit connected with the channel on the upstream side of the diaphragm for bringing the fluid pressure to bear to close the channel, an auxiliary valve in the conduit normally held in closed position by the pressure of the controlled fluid, spring means for opening the auxiliary valve when the fluid pressure falls, and locking means releasable only by the pressure of the controlled fluid upon it for holding said auxiliary valve in open position.

4. A self-closing and self-locking diaphragm valve, comprising a body in which is a channel incorporating a diaphragm seat, a diaphragm adapted to bed on the seat to close the valve and fluid-actuated valve-closing means including a movable piston above the diaphragm, a conduit connected with the channel on the upstream side of the diaphragm, the space between the piston and the diaphragm being open at all times to atmosphere, and means controlled by the pressure of the fluid for bringing the fluid through the conduit to bear on the piston to move the piston and the diaphragm to close the channel.

FRANK SUTTON.